(12) United States Patent
Tanaka et al.

(10) Patent No.: US 9,736,544 B2
(45) Date of Patent: Aug. 15, 2017

(54) MEDIA PLAYER IN QUICK MENU

(71) Applicants: SONY CORPORATION, Tokyo (JP); SONY NETWORK ENTERTAINMENT INTERNATIONAL LLC, Los Angeles, CA (US)

(72) Inventors: Yumiko Tanaka, San Francisco, CA (US); Jim Unwin, San Francisco, CA (US)

(73) Assignees: Sony Corporation, Tokyo (JP); Sony Interactive Entertainment LLC, San Mateo, CA (US)

( * ) Notice: Subject to any disclaimer, the term of this patent is extended or adjusted under 35 U.S.C. 154(b) by 0 days.

(21) Appl. No.: 14/581,767

(22) Filed: Dec. 23, 2014

(65) Prior Publication Data

US 2015/0208133 A1   Jul. 23, 2015

Related U.S. Application Data

(60) Provisional application No. 61/920,300, filed on Dec. 23, 2013.

(51) Int. Cl.
| | |
|---|---|
| G06F 3/00 | (2006.01) |
| G06F 13/00 | (2006.01) |
| H04N 5/445 | (2011.01) |
| H04N 21/482 | (2011.01) |
| H04N 21/431 | (2011.01) |
| H04N 21/472 | (2011.01) |
| H04N 21/432 | (2011.01) |
| H04N 21/442 | (2011.01) |

(52) U.S. Cl.
CPC ....... *H04N 21/4825* (2013.01); *H04N 21/431* (2013.01); *H04N 21/4312* (2013.01); *H04N 21/4314* (2013.01); *H04N 21/4316* (2013.01); *H04N 21/4325* (2013.01); *H04N 21/44222* (2013.01); *H04N 21/472* (2013.01); *H04N 21/47217* (2013.01); *H04N 21/482* (2013.01)

(58) Field of Classification Search
CPC ............. H04N 21/431; H04N 21/4312; H04N 21/4314; H04N 21/4316; H04N 21/472; H04N 21/482; H04N 21/4825
USPC ................................................ 725/37, 38, 43
See application file for complete search history.

(56) References Cited

U.S. PATENT DOCUMENTS

| | | | |
|---|---|---|---|
| 7,985,134 B2 | 7/2011 | Ellis | |
| 8,566,873 B2 | 10/2013 | Sie et al. | |
| 2003/0018778 A1* | 1/2003 | Martin et al. | 709/224 |
| 2003/0180032 A1* | 9/2003 | Barde | G11B 27/105 386/244 |
| 2006/0123353 A1* | 6/2006 | Matthews | G06F 3/0481 715/779 |
| 2006/0236342 A1* | 10/2006 | Kunkel et al. | 725/52 |
| 2006/0267995 A1* | 11/2006 | Radloff et al. | 345/530 |
| 2008/0005348 A1* | 1/2008 | Kosiba et al. | 709/231 |
| 2010/0094866 A1* | 4/2010 | Cuttner et al. | 707/723 |
| 2012/0167000 A1 | 6/2012 | Ryu et al. | |

(Continued)

*Primary Examiner* — Jeremy Duffield
(74) *Attorney, Agent, or Firm* — Haverstock & Owens LLP

(57) ABSTRACT

A media player in quick menu provides a user with easy access to control content. The media player in the quick menu enables a user to perform operations on the currently watched programming. The media player in the quick menu also provides the user with supplemental information and accessibility to additional content.

18 Claims, 7 Drawing Sheets

(56) References Cited

U.S. PATENT DOCUMENTS

2012/0311444 A1* 12/2012 Chaudhri ...................... 715/716
2014/0272859 A1*  9/2014 Mueller ................... G09B 5/02
                                                           434/257

* cited by examiner

MEDIA PLAYER IN QUICK MENU

CROSS-REFERENCE TO RELATED APPLICATION(S)

This application claims priority under 35 U.S.C. §119(e) of the U.S. Provisional Patent Application Ser. No. 61/920,300, filed Dec. 23, 2013 and titled, "MEDIA PLAYER IN QUICK MENU" which is hereby incorporated by reference in its entirety for all purposes.

FIELD OF THE INVENTION

The present invention relates to the user interfaces. More specifically, the present invention relates to a media player user interface.

BACKGROUND OF THE INVENTION

Cable companies provide user interfaces that enables a user to view channel and content information; however, these user interfaces have several shortcomings.

SUMMARY OF THE INVENTION

A media player in quick menu provides a user with easy access to control content. The media player in the quick menu enables a user to perform operations on the currently watched programming. The media player in the quick menu also provides the user with supplemental information and accessibility to additional content.

In one aspect, a method programmed in a non-transitory memory of a device comprises displaying video content, overlaying a menu on the video content and providing a media player within the menu, wherein the media player appears at the top of the menu when the menu is not being accessed. The menu automatically appears as a show is ending. The menu automatically disappears after a set amount of time of inactivity. The menu slides up on a display from the bottom of the display. The media player is a tile of the menu at the top of a list of tiles within the menu. The menu includes a plurality of tiles and the media player becomes an episode tile. The media player covers the menu when the menu is not in use. The video content includes live content and on demand content.

In another aspect, a system programmed in a non-transitory memory of a camera device comprises a display module configured for displaying video content, an overlay module configured for overlaying a menu on the video content and a providing module configured for providing a media player within the menu, wherein the media player appears at the top of the menu when the menu is not being accessed. The menu automatically appears as a show is ending. The menu automatically disappears after a set amount of time of inactivity. The menu slides up on a display from the bottom of the display. The media player is a tile of the menu at the top of a list of tiles within the menu. The menu includes a plurality of tiles and the media player becomes an episode tile. The media player covers the menu when the menu is not in use. The video content includes live content and on demand content.

In another aspect, an apparatus comprises a non-transitory memory for storing an application, the application for: displaying video content, overlaying a menu on the video content and providing a media player within the menu, wherein the media player appears at the top of the menu when the menu is not being accessed and a processing component coupled to the memory, the processing component configured for processing the application. The menu automatically appears as a show is ending. The menu automatically disappears after a set amount of time of inactivity. The menu slides up on a display from the bottom of the display. The media player is a tile of the menu at the top of a list of tiles within the menu. The menu includes a plurality of tiles and the media player becomes an episode tile. The media player covers the menu when the menu is not in use. The video content includes live content and on demand content.

DETAILED DESCRIPTION OF THE PREFERRED EMBODIMENT

A quick menu media player supports play behavior. The user is able to control play and appraise what he watches while still watching current content. In some embodiments, the quick menu media player appears automatically as a show is finishing. For example, it is able to be detected that a show/program has 10 seconds remaining, so the quick menu media player is presented. Determining how much time is remaining in a show is able to be performed based on the current time, the length of the show and how much of the show has been played or any other manner. The selection of the quick menu media player defaults to the "coming next" tile. The quick menu media player automatically disappears after a set amount of time of inactivity (e.g., 5 seconds).

The media player is triggered by pressing a button (or any other trigger such as a voice command, motion sensor), and the media player appears as part of the quick menu. Play controls are able to be made when the player tile is highlighted. By pressing a specified button (e.g., square), users are able to see extended information and functions about the content, including player options.

Figure 1:
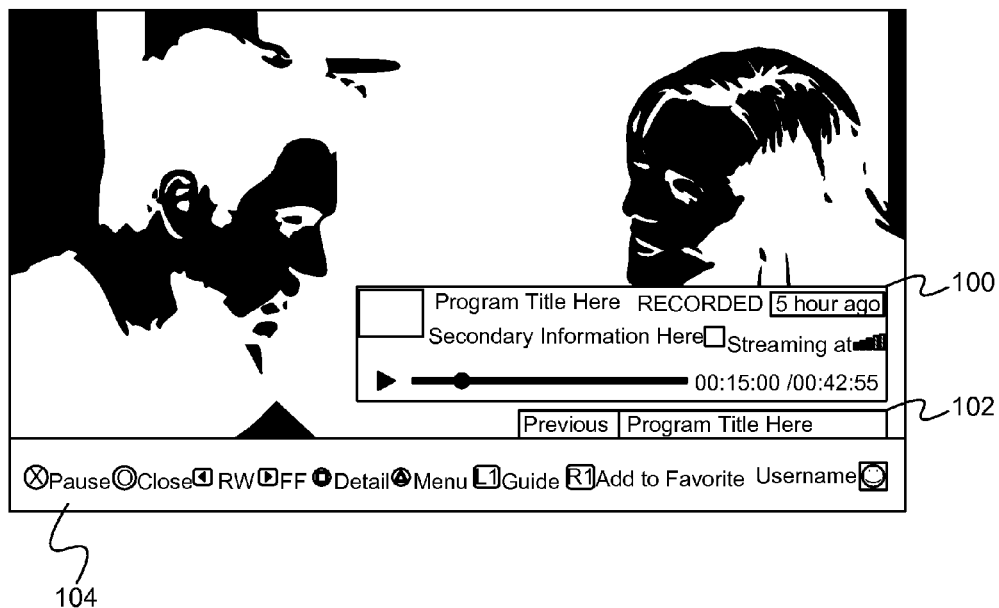
FIG. 1 illustrates an exemplary screenshot of a video and a quick menu media player according to some embodiments.

FIG. 1 illustrates an exemplary screenshot of a video and a quick menu media player according to some embodiments. The player module 100 provides information as well as interactive options such as a play button. The next tile 102 on the quick menu is partially shown. The system voice 104 provides operational details.

The player module 100 provides an episode tile. The episode tile is the same tile used on the quick menu, and the episode tile becomes part of the player. Program titles and main content information are shown on the player module 100. A live/recorded indicator is displayed which indicates whether the content is live or recorded, as well as timestamp information. A streaming strength indicator is also displayed to show the condition of the Internet connection as streaming quality. A play control bar is at the bottom of the player module 100 which enables users to play, pause, stop and jump to different times in a program.

Figure 2:
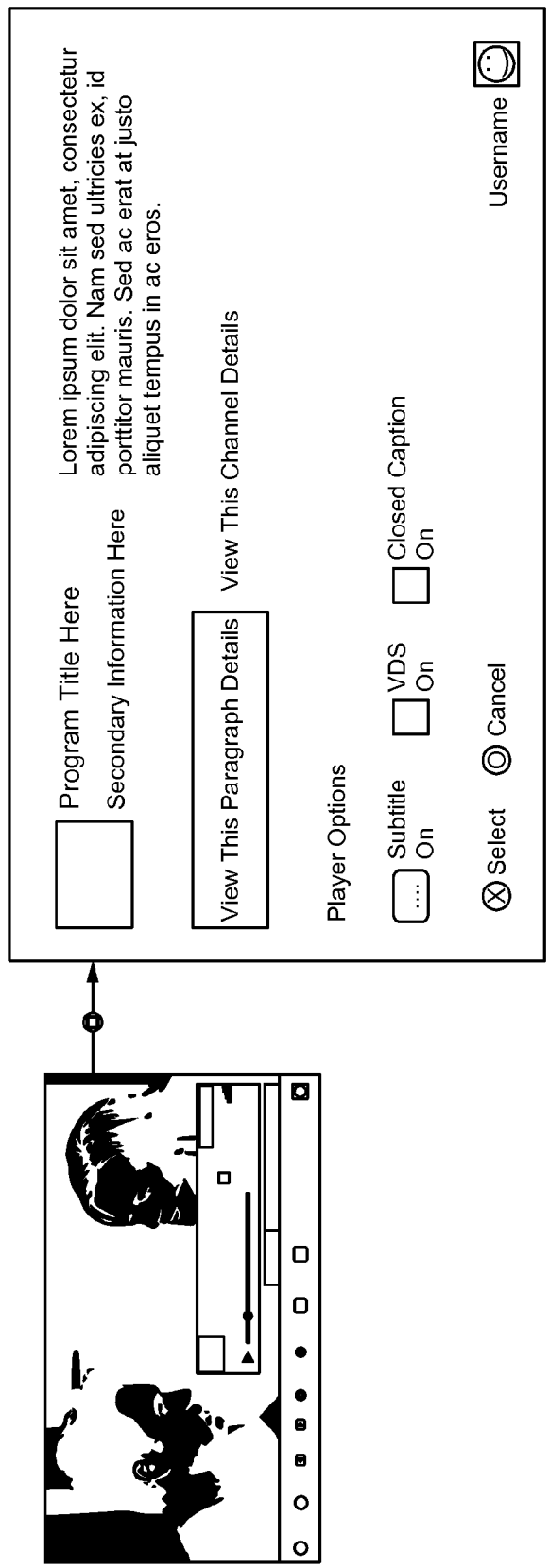
FIG. 2 illustrates an exemplary screenshot of player details according to some embodiments.

FIG. 2 illustrates an exemplary screenshot of player details according to some embodiments. The player includes an episode tile for watching content. An episode synopsis is able to be provided. Buttons are included for a user to select to view program details or channel details. Additionally, player options are available such as subtitles and closed caption.

Figure 3:
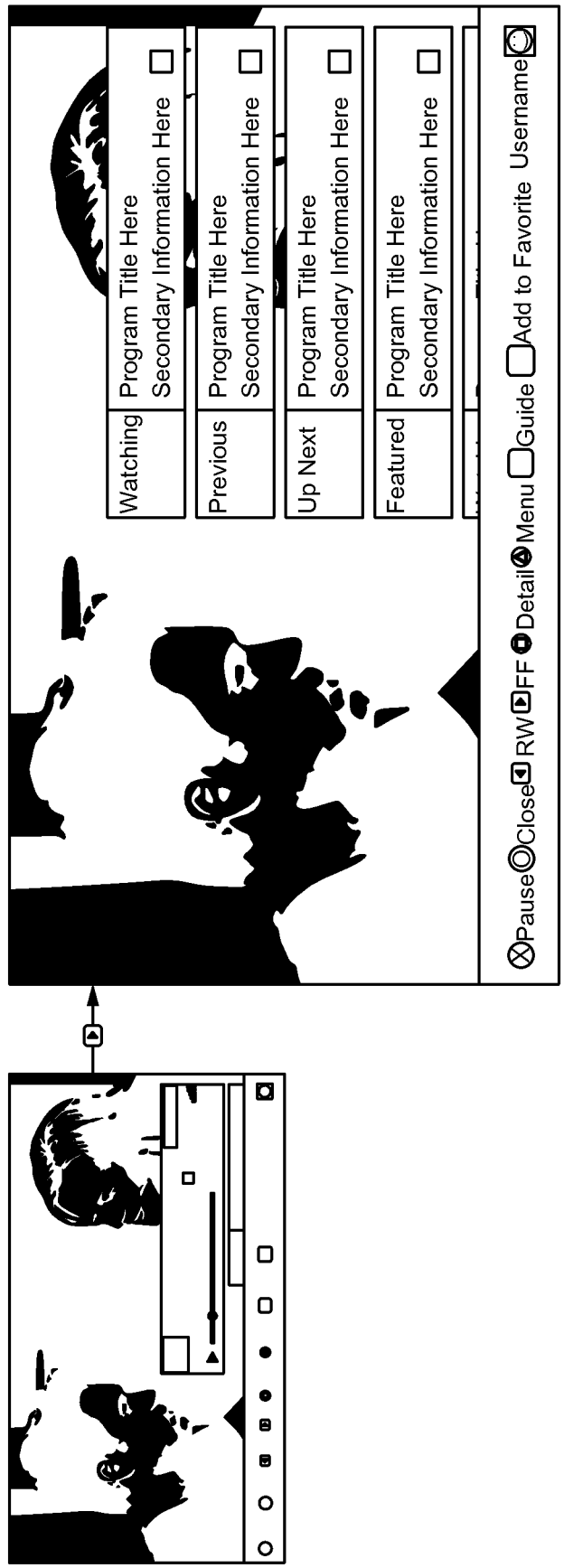
FIG. 3 illustrates an exemplary screenshot of a player and quick menu according to some embodiments.

FIG. 3 illustrates an exemplary screenshot of a player and quick menu according to some embodiments. When users press down while the player is the focus, the quick menu slides in from the bottom. The player becomes an episode tile and stays on the top of the list. The quick menu is also shown up for 10 seconds before an episode. The quick menu contains episode tiles for "watching," "previous" and "up next," followed by episode tiles of "featured" content.

Figure 4:
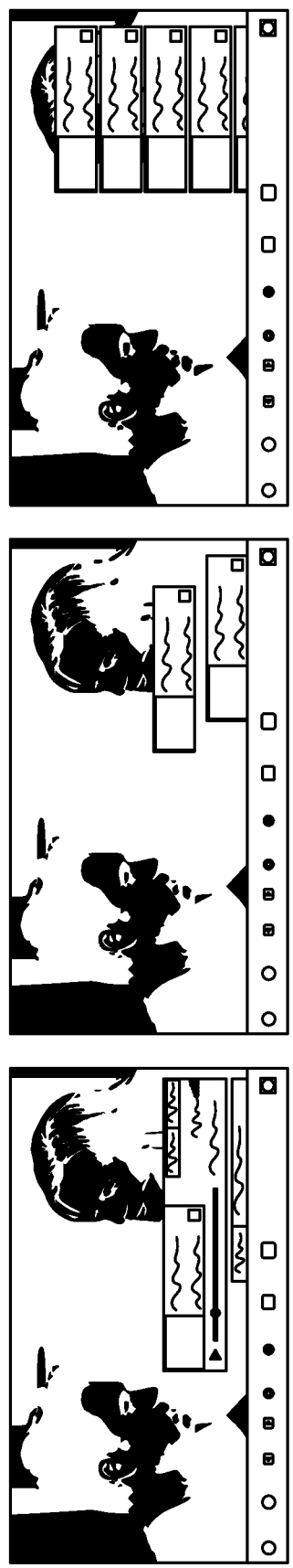
FIG. 4 illustrates an exemplary screenshot of a player to quick menu transition according to some embodiments.

FIG. 4 illustrates an exemplary screenshot of a player to quick menu transition according to some embodiments. The episode tile remains, but the other area in the player is dissolved. The tile from the player starts to have "watching" label on it. The tile moves to the right to group into the quick menu tiles. Highlighting moves down to start highlighting the next tile "previous." The quick menu list slides in from the bottom and pushes the "watching" and "previous" tiles up. In some embodiments, the media player is on the top of the quick menu when not being used or accessed. For example, the media player replaces or covers the quick menu.

Figure 5:
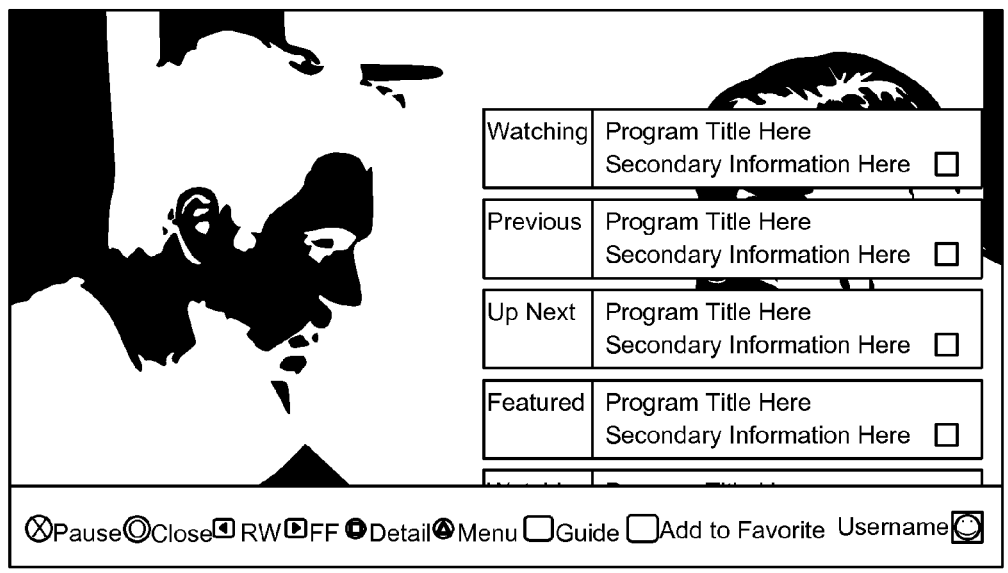
FIG. 5 illustrates an exemplary screenshot of a quick menu according to some embodiments.

FIG. 5 illustrates an exemplary screenshot of a quick menu according to some embodiments. The quick menu list slides in from the bottom. The quick menu shows a tile of an episode currently being watched, previously watched content, and content up next. For up next content, when the content is recorded, the user is able to select to start watching, and for live television, the episode tile does not start playing the content. When the next content will start within 10 seconds, shows a countdown timer on the tile. Featured programs are also able to be displayed in the quick menu. Additional information is able to be provided in the quick menu as well, such as description information.

Figure 6:
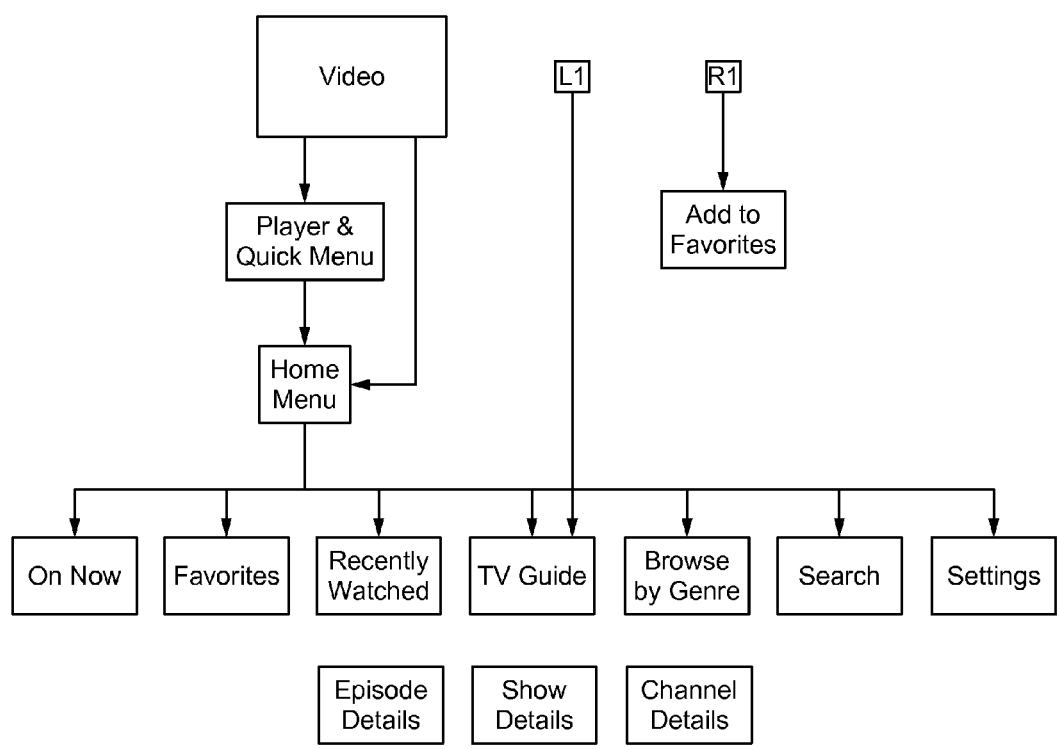
FIG. 6 illustrates a diagram of an app structure of the media player in quick menu according to some embodiments.

FIG. 6 illustrates a diagram of an app structure of the media player in quick menu according to some embodiments. The player and quick menu are available from the video. The home menu is available from the video and the player and quick menu. The home menu includes: on now, favorites, recently watched, featured, television guide, browse by genre, search, settings and any other item. The "add to favorites" shortcut is available from any episode, show or channel item. Details such as episode details, show details or channel details are able to be displayed.

Figure 7:
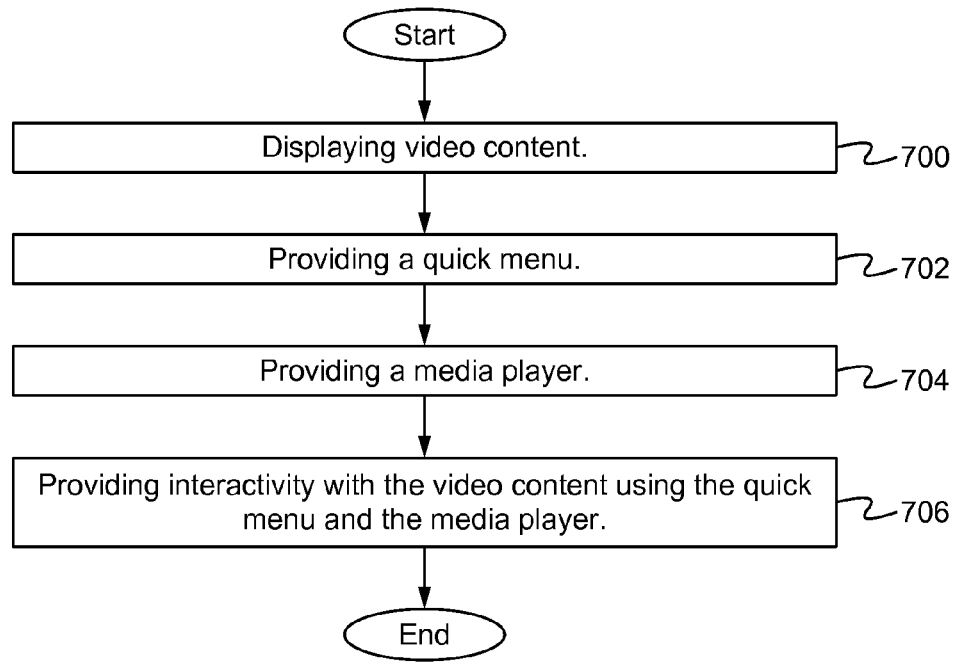
FIG. 7 illustrates a flowchart of utilizing the media player in quick menu according to some embodiments.

FIG. 7 illustrates a flowchart of utilizing the media player in quick menu according to some embodiments. In the step 700, video content is displayed. In some embodiments, the video content is live content, on demand content or a combination thereof. In the step 702, a quick menu is provided on/with the video content. For example, the quick menu is overlaid on the video content. In the step 704, a media player is provided in the quick menu. For example, the media player is embedded within the quick menu. In another example, the media player is a top menu item of the quick menu, and when the quick menu is not being utilized or accessed, the media player appears at the top or front of the quick menu with the rest of the quick menu content below or behind the media player. In the step 706, the quick menu provides interactivity with the live or on demand video content. For example, a user is able to play programs, view information about content, determine future content, search for content, and many other functions. In some embodiments, fewer or additional steps are implemented. In some embodiments, the order of the steps is modified.

Figure 8:
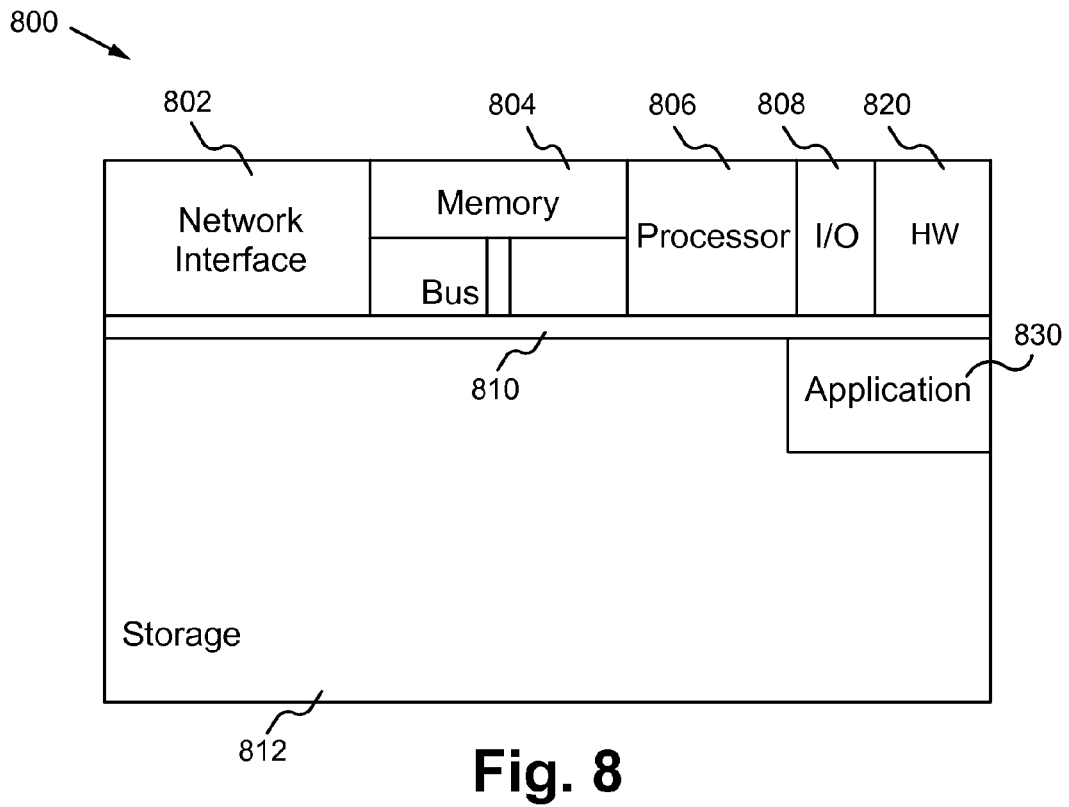
FIG. 8 illustrates a block diagram of an exemplary computing device configured to implement the media player in quick menu according to some embodiments.

FIG. 8 illustrates a block diagram of an exemplary computing device configured to implement the media player in quick menu according to some embodiments. The computing device 800 is able to be used to acquire, store, compute, process, communicate and/or display information such as images and videos. In general, a hardware structure suitable for implementing the computing device 800 includes a network interface 802, a memory 804, a processor 806, I/O device(s) 808, a bus 810 and a storage device 812. The choice of processor is not critical as long as a suitable processor with sufficient speed is chosen. The memory 804 is able to be any conventional computer memory known in the art. The storage device 812 is able to include a hard drive, CDROM, CDRW, DVD, DVDRW, High Definition disc/drive, ultra-HD drive, flash memory card or any other storage device. The computing device 800 is able to include one or more network interfaces 802. An example of a network interface includes a network card connected to an Ethernet or other type of LAN. The I/O device(s) 808 are able to include one or more of the following: keyboard, mouse, monitor, screen, printer, modem, touchscreen, button interface and other devices. Media player in quick menu application(s) 830 used to implement the media player in quick menu are likely to be stored in the storage device 812 and memory 804 and processed as applications are typically processed. More or fewer components shown in FIG. 8 are able to be included in the computing device 800. In some embodiments, media player in quick menu hardware 820 is included. Although the computing device 800 in FIG. 8 includes applications 830 and hardware 820 for the media player in quick menu, the media player in quick menu is able to be implemented on a computing device in hardware, firmware, software or any combination thereof. For example, in some embodiments, the media player in quick menu applications 830 are programmed in a memory and executed using a processor. In another example, in some embodiments, the media player in quick menu hardware 820 is programmed hardware logic including gates specifically designed to implement the media player in quick menu.

In some embodiments, the media player in quick menu application(s) 830 include several applications and/or modules. In some embodiments, modules include one or more sub-modules as well. In some embodiments, fewer or additional modules are able to be included.

Examples of suitable computing devices include a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, a smart phone, a portable music player, a tablet computer, a mobile device, a video player, a video disc writer/player (e.g., DVD writer/player, high definition disc writer/player, ultra high definition disc writer/player), a television, a home entertainment system, smart jewelry (e.g., smart watch) or any other suitable computing device.

To utilize the media player in quick menu, a user provides input such as selecting buttons. The input causes the media player to appear in the quick menu and enables selections to be made. Users are able to view descriptions, play content, determine additional content and many other features utilizing the media player in quick menu.

In operation, the media player in the quick menu enables users to control their viewing content much more easily, as well as determine additional content to view.

Some Embodiments of Media Player in Quick Menu

1. A method programmed in a non-transitory memory of a device comprising:
   a. displaying video content;
   b. overlaying a menu on the video content; and
   c. providing a media player within the menu, wherein the media player appears at the top of the menu when the menu is not being accessed.
2. The method of clause 1 wherein the menu automatically appears as a show is ending.
3. The method of clause 1 wherein the menu automatically disappears after a set amount of time of inactivity.
4. The method of clause 1 wherein the menu slides up on a display from the bottom of the display.
5. The method of clause 1 wherein the media player is a tile of the menu at the top of a list of tiles within the menu.
6. The method of clause 1 wherein the menu includes a plurality of tiles and the media player becomes an episode tile.
7. The method of clause 1 wherein the media player covers the menu when the menu is not in use.
8. The method of clause 1 wherein the video content includes live content and on demand content.
9. A system programmed in a non-transitory memory of a camera device comprising:
   a. a display module configured for displaying video content;
   b. an overlay module configured for overlaying a menu on the video content; and
   c. a providing module configured for providing a media player within the menu, wherein the media player appears at the top of the menu when the menu is not being accessed.
10. The system of clause 9 wherein the menu automatically appears as a show is ending.
11. The system of clause 9 wherein the menu automatically disappears after a set amount of time of inactivity.
12. The system of clause 9 wherein the menu slides up on a display from the bottom of the display.
13. The system of clause 9 wherein the media player is a tile of the menu at the top of a list of tiles within the menu.
14. The system of clause 9 wherein the menu includes a plurality of tiles and the media player becomes an episode tile.
15. The system of clause 9 wherein the media player covers the menu when the menu is not in use.
16. The system of clause 9 wherein the video content includes live content and on demand content.
17. An apparatus comprising:
    a. a non-transitory memory for storing an application, the application for:
       i. displaying video content;
       ii. overlaying a menu on the video content; and
       iii. providing a media player within the menu, wherein the media player appears at the top of the menu when the menu is not being accessed; and
    b. a processing component coupled to the memory, the processing component configured for processing the application.
18. The apparatus of clause 17 wherein the menu automatically appears as a show is ending.
19. The apparatus of clause 17 wherein the menu automatically disappears after a set amount of time of inactivity.
20. The apparatus of clause 17 wherein the menu slides up on a display from the bottom of the display.
21. The apparatus of clause 17 wherein the media player is a tile of the menu at the top of a list of tiles within the menu.
22. The apparatus of clause 17 wherein the menu includes a plurality of tiles and the media player becomes an episode tile.
23. The apparatus of clause 17 wherein the media player covers the menu when the menu is not in use.
24. The apparatus of clause 17 wherein the video content includes live content and on demand content.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims.

What is claimed is:

1. A method programmed in a non-transitory memory of a device comprising:
   a. displaying video content;
   b. overlaying a menu on the video content;
   c. providing a media player within the menu, wherein the menu includes a plurality of tiles and the media player becomes an episode tile, and further wherein the media player appears at the top of the menu only when the menu is not being accessed, wherein the menu automatically appears as a show is ending as determined based on a current time and a length of the show and further wherein the menu includes previous content, current content, and future content; and
   d. transitioning from the media player to one or more episode tiles by dissolving non-episode tile components of the media player, wherein the media player includes the non-episode tile components including a play bar, play time information, and streaming strength, and the one or more episode tiles are limited to title information and description information related to content.
2. The method of claim 1 wherein the menu automatically disappears after a set amount of time of inactivity.
3. The method of claim 1 wherein the menu slides up on a display from the bottom of the display.
4. The method of claim 1 wherein the media player is a tile of the menu at the top of a list of tiles within the menu.
5. The method of claim 1 wherein the media player covers the menu when the menu is not in use.
6. The method of claim 1 wherein the video content includes live content and on demand content.
7. A system programmed in a non-transitory memory of a camera device comprising:
   e. a display module configured for displaying video content;
   f. an overlay module configured for overlaying a menu on the video content;
   g. a providing module configured for providing a media player within the menu, wherein the menu includes a plurality of tiles and the media player becomes an episode tile, and further wherein the media player appears at the top of the menu only when the menu is not being accessed, wherein the menu automatically appears as a show is ending as determined based on a current time and a length of the show, and further wherein the menu includes previous content, current content, and future content; and h. a transitioning module configured for transitioning from the media player to one or more episode tiles by dissolving non-episode tile components of the media player, wherein the media player includes the non-episode tile components including a play bar, play time information, and streaming strength, and the one or more episode tiles are limited to title information and description information related to content.

8. The system of claim 7 wherein the menu automatically disappears after a set amount of time of inactivity.

9. The system of claim 7 wherein the menu slides up on a display from the bottom of the display.

10. The system of claim 7 wherein the media player is a tile of the menu at the top of a list of tiles within the menu.

11. The system of claim 7 wherein the media player covers the menu when the menu is not in use.

12. The system of claim 7 wherein the video content includes live content and on demand content.

13. An apparatus comprising:
 i. a non-transitory memory for storing an application, the application for:
  i. displaying video content;
  ii. overlaying a menu on the video content;
  iii. providing a media player within the menu, wherein the menu includes a plurality of tiles and the media player becomes an episode tile, and further wherein the media player appears at the top of the menu only when the menu is not being accessed, wherein the menu automatically appears as a show is ending as determined based on a current time and a length of the show, wherein the menu includes previous content, current content, and future content; and
  iv. transitioning from the media player to one or more episode tiles by dissolving non-episode tile components of the media player, wherein the media player includes the non-episode tile components including a play bar, play time information, and streaming strength, and the one or more episode tiles are limited to title information and description information related to content; and
 j. a processing component coupled to the memory, the processing component configured for processing the application.

14. The apparatus of claim 13 wherein the menu automatically disappears after a set amount of time of inactivity.

15. The apparatus of claim 13 wherein the menu slides up on a display from the bottom of the display.

16. The apparatus of claim 13 wherein the media player is a tile of the menu at the top of a list of tiles within the menu.

17. The apparatus of claim 13 wherein the media player covers the menu when the menu is not in use.

18. The apparatus of claim 13 wherein the video content includes live content and on demand content.

* * * * *